(12) United States Patent
Harrison (10) Patent No.: US 6,964,488 B2
(45) Date of Patent: Nov. 15, 2005

(54) REFLECTOR DISH

(76) Inventor: John James Harrison, White House, Caldwell, Richmond, North Yorkshire (GB) DL117PU ( * ) Notice: Subject to any disclaimer, the term of this patent is extended or adjusted under 35 U.S.C. 154(b) by 91 days.

(21) Appl. No.: 10/466,822

(22) PCT Filed: Jan. 22, 2002

(86) PCT No.: PCT/GB02/00248

§ 371 (c)(1),
(2), (4) Date: Jul. 18, 2003

(87) PCT Pub. No.: WO02/060003

PCT Pub. Date: Aug. 1, 2002

(65) Prior Publication Data

US 2004/0105176 A1     Jun. 3, 2004

(30) Foreign Application Priority Data

Jan. 23, 2001   (GB) .................................... 0101745

(51) Int. Cl.[7] ............................ G02B 7/182; F24J 2/12
(52) U.S. Cl. ..................... 359/871; 359/853; 126/696; 126/690
(58) Field of Search ............................... 359/399, 850, 359/851, 853, 871; 126/684, 688, 689, 690, 126/691, 696

(56) References Cited

U.S. PATENT DOCUMENTS 4,291,677 A  *  9/1981  Monk .......................... 126/606
5,325,844 A  *  7/1994  Rogers et al. .............. 126/605

* cited by examiner

*Primary Examiner*—Mark A. Robinson (57) ABSTRACT

Reflector dish having a reflective surface for reflecting incident radiation to a focal region and a receiver for receiving radiation reflected by the reflective surface. A reflective surface support (26) supports the reflective surface. A receiver support (2) supports the receiver substantially in the focal region of the reflecting surface. The receiver support (2) includes at least one first elongate member (4) extending from substantially the central axis of the dish towards the outside of the dish, and a second elongate member (6) extending from the outer end of the or each first elongate support member (4) and connected to the receiver for supporting the receiver. The receiver support (2) is not in load bearing contact with the reflective surface (26). The reflective surface support (26) and the receiver support (2) are each supported by a support means (34) provided generally on or close to the central axis of the dish.

23 Claims, 6 Drawing Sheets

REFLECTOR DISH

Known reflector dishes assemblies for receiving electromagnetic radiation comprise a reflective surface and a receiver positioned in or near the focal region of the reflective surface to receive the reflected incident radiation. The reflective surface, which is usually parabolic, hemispherical or a portion of a sphere, is supported by a support structure, often comprising a number of radially extending support beams or trusses. The receiver may itself be a reflector that reflects radiation to a separate receiver. In the present specification, the term "receiver" is taken to include such a reflector.

There is a problem in supporting the receiver accurately in or near the focal region of the reflective surface without the support interfering unacceptably with the electromagnetic radiation passing between the source and the reflective surface, or between the reflective surface and the receiver, and without otherwise affecting the stability or shape of the reflector dish.

It is known to support the receiver on the end of a tube or frame extending from the centre of the reflective surface approximately perpendicular to it. The tube itself interferes minimally with electromagnetic radiation on to and from the reflective surface. However, in one example using this system to collect solar energy, four water-cooled tubes are provided between the top of the tube and the receiver to support the receiver. These tubes intercept a significant proportion of the radiation reflected from the reflective surface. Also, especially when the reflector dish is vertical, the tube or frame will tend to bend due to the weight of the receiver on the unsupported end of the tube or frame. Therefore, the receiver will not be in or near the focal region of the reflective surface, and therefore will not receive the reflected radiation as desired. To overcome this problem, it is known to provide a number of wires between the receiver and the reflective surface or the support for the reflective surface. These wires will help bear the weight of the receiver, and thereby prevent the tube or frame from bending and the receiver moving away from the focal region of the reflector. However, especially where the receiver is heavy, for example where the reflector dish is used for reflecting solar energy and the receiver is a solar energy engine, such as a Stirling engine, high forces are applied to the reflector dish through these wires. This may result in the distortion of the dish and reflective surface. This in turn may reduce the efficiency and accuracy of the dish, and is therefore undesirable.

It is also known to support the receiver by members connected directly to the dish. However, this again leads to potential problems of distortion of the dish and the associated reduction in efficiency and accuracy.

It is also known to mount the receiver and the reflector dish separately.

As shown in the paper "Solar thermal electricity in 1998: An IEA/solarPACES summary of status and future prospects" by C. E. Tyner et al in J. Phys. IV France 9 (1999) at page 3–20, SAIC has installed a prototype reflector dish in the US. Here the whole dish is mounted on the top of a vertical tube fixed to the ground. The horizontal axis of rotation of the dish is about a point on top of this vertical tube. An arm extends from one side of this axis. Fixed to the end of this arm is a receiver and a Sterling engine. On the other side of this axis is a cradle which supports the reflector dish itself. This design allows the weight of the receiver, engine and its support arm to counterbalance the weight of the dish itself. The major advantages to this system, indeed the overriding design features, are that when the whole structure is supported at its centre of gravity, the bending forces in the vertical support tube are minimised, and the forces required to rotate the dish about the horizontal axis are low. However supporting and rotating the dish about its centre of gravity has several disadvantages. In order for the dish to tilt to the horizontal, the vertical support tube must pass through the radius of the reflector dish. To allow this, the reflector dish has a part removed, reducing the stiffness of the dish by preventing forces travelling around the dish.

Also, as the dish approaches vertical, the arm supporting the receiver bends downs under gravity, about the horizontal axis, causing the receiver to displace downwards. The cradle supporting the reflector dish also displaces downwards about the other side of the horizontal axis causing the focal region to be displaced upwards. These two factors combine to cause the focal area of the dish to be above the receiver, further reducing the optical efficiency of the dish.

According to the present invention, a reflector dish comprises:
  a reflective surface for reflecting incident radiation to a focal region;
  a receiver for receiving radiation reflected by the reflective surface;
  a reflective surface support for supporting the reflective surface; and,
  a receiver support for supporting the receiver substantially in the focal region of the reflecting surface, the receiver support not being in load bearing contact with the reflective surface, in which the reflective surface support and the receiver support are each supported by a support means provided generally on or close to the central axis of the dish, and in which the receiver support includes a first elongate member extending from substantially the central axis of the dish towards the outside of the dish, and a second elongate member extending from the outer end of the elongate support member and connected to the receiver for supporting the receiver.

By having separate supports for the receiver and the reflective surface, both supported by a support means on or close to the central axis of the dish, the weight of the receiver will not distort the reflective surface, yet the reflective surface and receiver can be moved together, with the receiver remaining at or near the focal region.

The receiver may be the device that receives and uses the reflected radiation, for example converts solar radiation to useable energy. Alternatively, the receiver may be a reflector or other optical component for directing the radiation to another component for using the reflected radiation.

By providing a first elongate member extending towards the outside of the dish, from which the second elongate member extends to support the receiver, the second elongate member may be mounted above the hypothetical cone of radiation reflected from the reflective surface, and therefore this member will not intercept the reflected radiation.

The receiver support preferably includes more than one first and one second elongate member. In a preferred example, two or more first elongate members are provided extending from substantially the central axis of the dish, with a second elongate member extending from the outer end of each member to the receiver.

The, or one where there are more than one, of the first elongate members is preferably positioned to be approximately vertical when the dish is vertical.

In this way, the weight of the receiver is supported by the elongate members without distorting the member or members. A dish is considered vertical when the rim of the dish lies in a generally vertical plane.

The first elongate member, or members, of the receiver support may be in the form of a truss or a hollow, box-like structure. This provides a strong, but lightweight, support.

The reflective surface support advantageously includes a plurality of trusses. As with the receiver support, such an arrangement provides a strong, lightweight support.

Where trusses are provided, these may comprise either only a top and a bottom chord, a top and two bottom chords or two top and one bottom chord to make a triangular truss, or two top and two bottom chords for a box-truss. In any case, the or each top chord is preferably of larger diameter or size than the bottom chord. The chords are preferably hollow tubes.

The receiver support may be provided behind the reflective surface. However, the receiver support may extend through the reflective surface. In this way, only part of the receiver support is provided in front of the reflective surface, where the support may interfere with the radiation incident on, or reflected from, the reflective surface. The other part of the receiver support is behind the reflective surface, and so does not interfere with the radiation. The reflective surface may be removed or omitted in the areas below the receiver support. This helps avoid the radiation being interfered with by the receiver support, and allows wind to pass through the areas below the support, reducing the wind loads on the structure supporting the reflective surface. In any case, where any part of the first elongate member is positioned above the reflective surface of the dish, it is preferred that the part is as close as possible to the reflective surface to minimise interception of radiation reflected therefrom.

The support means provided on or close to the central axis of the dish may comprise a single support member, two concentric tubes, a plurality of separate members or a ring. The support means may comprise a ring formed from the inner cross-members of the trusses forming the reflective surface support, with plates attached to the ring to which the first elongate member of the receiver support is attached.

The reflective surface support may be supported by a first member, the receiver support may be supported by a second member, the two members being commonly supported.

The support means are preferably stiff, and formed from load bearing material to minimise displacements of the receiver.

The receiver support may be arranged to displace slightly to ensure the receiver remains in the focal region, for example when the dish is in the vertical position.

Figure 1:
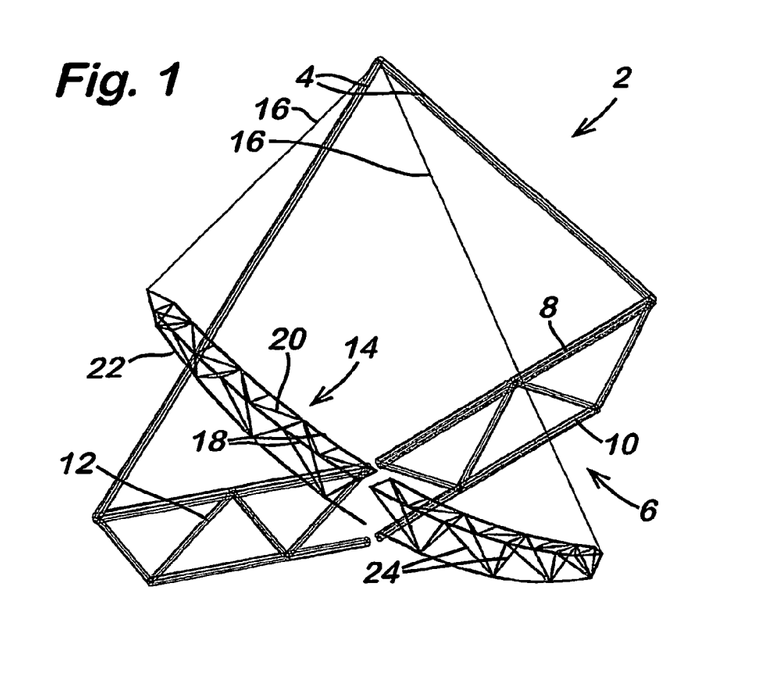
FIG. 1 shows a perspective view of a structure for supporting a receiver in a reflector dish.

Several embodiments will now be described with reference to the following drawings:

FIG. 1 shows an example of a receiver support structure 2.

Two radially extending trusses 6 are provided. These trusses 6 each comprise a top chord 8 and a bottom chord 10. The chords 8,10 are braced together with cross members 12. From the end of each truss 6, an elongate support member 4 is provided, extending to a point at which a receiver (not shown) is supported.

Two lighter trusses 14, also extending radially, are provided, and support two wires 16 which are connected from the end of trusses 14 to the top of members of 4 near the receiver. Trusses 14 comprise a pair of top chords 18 fixed to each other with bracing members 20. Chord 22 forms the bottom of truss 14 and is braced to top chords 18 by bracing members 24 in two planes, each plane being formed between chord 22 and each of chords 18. As described below, the trusses 6, 14 are supported by a central support, to thereby support the receiver.

Figure 2:
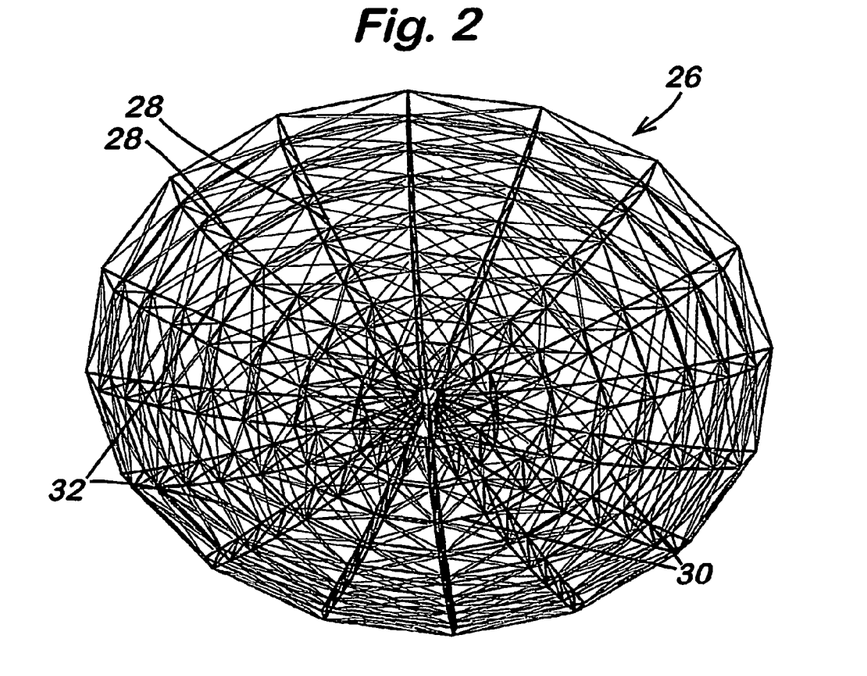
FIG. 2 shows a perspective view of a structure for supporting the reflective surface of the dish.

FIG. 2 shows an example of a structure 26 for supporting the reflective surface of a receiver dish. The structure 26 comprises a number of trusses 28 extending from the centre of the dish to the outer edge. The trusses 28 are linked together with members 30 and stabilising wires 32.

Figure 3:
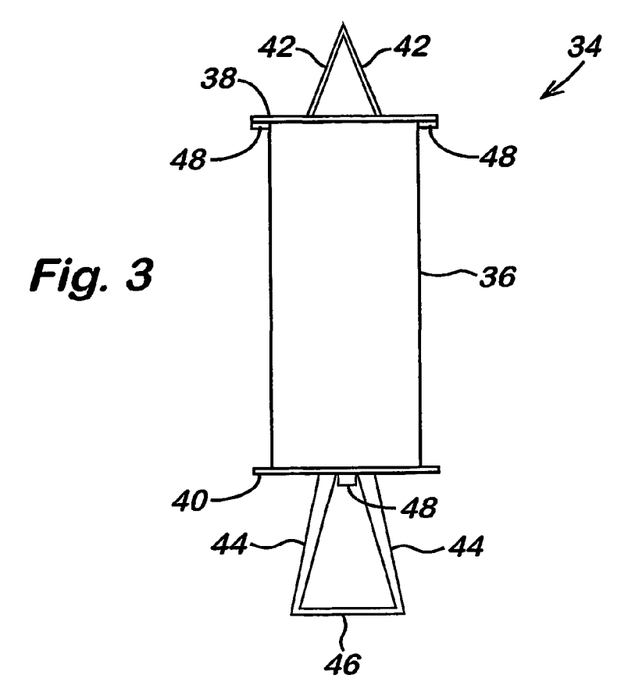
FIG. 3 shows a side elevation of a first example of a centre support structure for supporting the support structures of FIGS. 1 and 2.

FIG. 3 shows a side elevation of an example of a central support structure 34. In use, the receiver support as shown in FIG. 1 and the reflective surface support as shown in FIG. 2 are connected to and supported by the central support structure 34. The central support structure 34 comprises a central tube 36 having a large diameter, for example of between 1 and 2.5 m, with a circular end plate 38, 40 fixed to each end. Fixed to the top of plate 38 are two plates 42, which form a triangle. Fixed to the bottom of plate 40 are two further plates 44, which form a frustum shape with plate 40 and a bottom plate 46. Small plates 48 are attached to the end plates 38, 40. The diameter of tube 36 may typically be $\frac{1}{30}^{th}$ that of the diameter of the dish.

Figure 4:
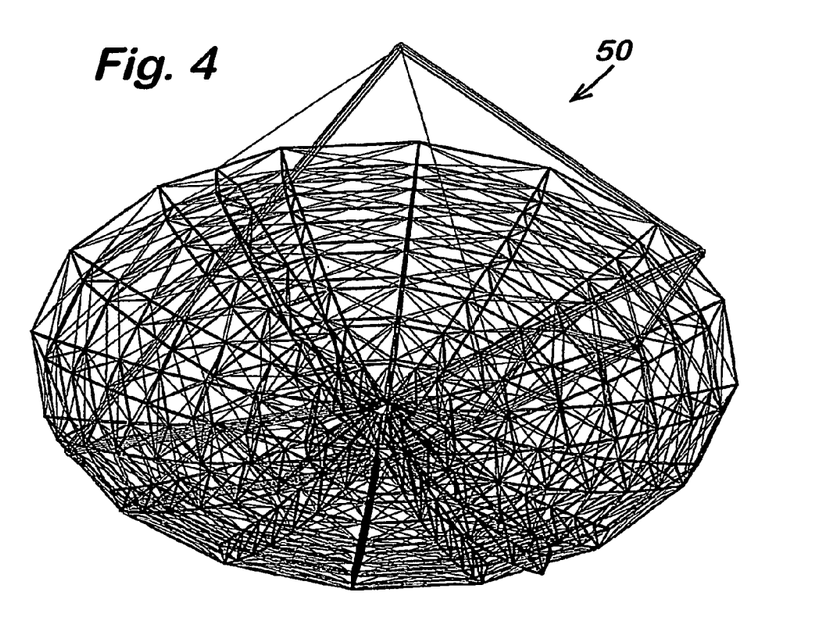
FIG. 4 shows a perspective view of the whole structure of the supports of FIGS. 1 to 3.

A dish according to one example of the present invention comprises the receiver support 2, supporting a receiver (not shown), and a reflective surface support 26 supporting a reflective surface (not shown). The reflective surface support 26 and the receiver support 2 are supported by a central support 34. The resulting support structure 50 is shown in FIG. 4. The top and bottom chords of lighter trusses 14 are fixed to the small plates 48 on the circular end plates 38, 40. The trusses 28 of the reflective surface support 26 are fixed to the end plates 38, 40. The top and bottom chords of the main receiver support trusses 6 are connected to the plates 42 and 44 respectively. The wires 16 connect the ends of lighter trusses 14 to a point near the receiver on members 4 and prevent members 4 and the receiver bending sideways. These wires 16 are preferably placed in tension.

The triangular and frustum shape formed by plates 42, 44, 46 is to allow the end of the members forming chords 8, 10 to be cut off perpendicular to their length. Chords 8, 10 thus slope upwards from the centre of the dish when the dish is horizontal. Alternatively plates 42, 46 may be fixed perpendicular to plates 38, 40 and the ends of the members forming chords 8, 10 cut off at an angle to give the same effect.

The reflective surface support 26 and the receiver support 2 are only connected through the central support structure 34. There is no connection capable of carrying substantial loads between the reflective surface support 26 and the receiver support 2 at any other point on the whole structure apart from at the central support structure 34. This means any displacement of the reflective surface support 26, due for example to wind or changing weight distributions as the whole structure 50 tilts towards the vertical, do not place any loads on the receiver support 2 and so do not alter its position or that of the receiver. Displacements of the receiver support 2 will not place any loads on the reflective surface support 26 and so will not distort it, which would otherwise reduce its optical performance.

The total gravity induced displacement to the receiver at any given position, between horizontal and vertical, is the sum of the displacements of the structure which supports the receiver, and the displacement of the structure which supports the structure supporting the receiver, for example structure 34. The displacements of the structure which supports the receiver support structure are between the point where structure 34 is supported from the ground and the point where the structure supporting the receiver fixes to it. Any displacements between these two points are greatly magnified at the receiver, so it is important that they are kept to an absolute minimum. This is achieved by supporting structure 34 above the ground at a point close to where the structure supporting the receiver fixes to it. The space between these two points is filled with large amounts of load bearing material, for example steel, to increase the stiffness.

Similarly the displacement of the focal point or region of the dish is the result of the sum of the displacements of the structure supporting the reflective surface and the structure which supports it, structure 34. These displacements are also controlled by keeping the connection points close together and using large amounts of load bearing material.

As the whole structure moves from horizontal to vertical, displacements of the receiver and the focal region of point of the dish due to the structures supporting them are not always in the same direction or of the same size.

Thus it is important that the structure which supports both these structures does not allow these structures to move relative to each other. Where truss structures are used to support the reflective surface and the receiver, this is achieved by placing and supporting the ends of the top chords of these trusses close together and preferably close to the support which holds the whole structure above the ground.

The fact that the support connections are close together means that the load bearing material fills only a small space so even when large amounts are used in this space, the proportion of the weight provided by this material to the weight of the whole structure is small.

When the structure supporting the receiver and the reflective surface are trusses, the tube 36 of structure 34 connects the top and bottom chords of these trusses together. The forces acting between the points where the whole structure is supported above the ground and the connection points of the trusses may cause bending moments and tensile or compressive forces on this tube 36. The large diameter of this tube 36 carries these forces with small displacements, helping to keep the whole structure stiff.

The dish according to this example is especially advantageous if the mounting which allows the dish to rotate and tilt always places the same point on the outer edge of the dish to the lowest point. This ensures that as the dish tilts, the weight of trusses 6, elongate members 4 and the receiver are always in the plane of the truss 6 and give rise to axial forces of tension or compression and very small or negligible bending moments in the members forming the truss and members 4. Axial forces only compress and stretch material forming the members directly and thus keep displacements to a minimum.

In this embodiment, the top chords 8 of trusses 6 which support members 4 and the receiver are above the reflective surface of the dish, with the dish horizontal, and the bottom chords 10 are below the structure 26 which supports the reflective surface. This helps ensure that chords 8 and 10 do not make contact with the reflective surface support 26, or the reflective surface and distort or damage them. The reflective surface is omitted from the area directly below top chord 8, because any incoming waves would be intercepted by the chord 8. This also allows bracing members 12 to more easily pass through the reflective surface. Bracing members 12 do not make load-transferring contact with the members forming the reflective surface support 26 or the reflective surface itself. It is preferable that bracing members 12 pass between two of the trusses 28 on structure 26 which supports the reflective surface. This allows the structure supporting the reflective surface to form a complete circle, increasing its stiffness and the performance of the dish. This can be seen in FIG. 5, which shows the whole structure in plan.

Figure 6:
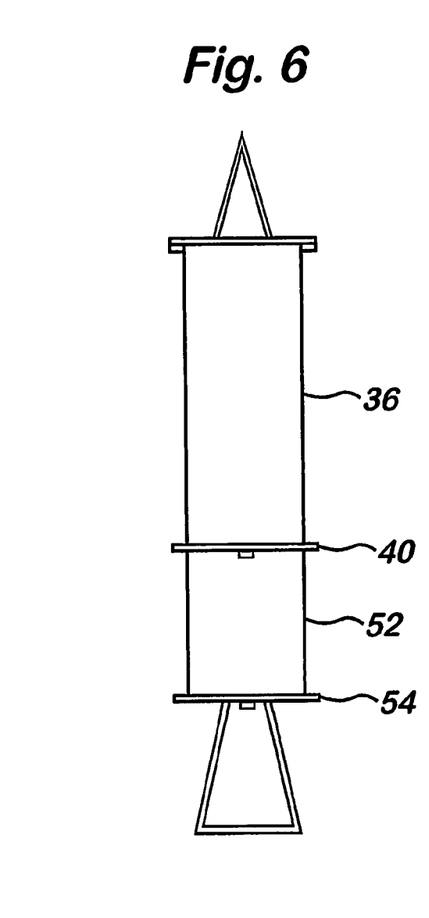
FIG. 6 shows an alternative example of a central support structure for a receiver and a reflective surface support.

FIG. 6 shows an alternative example of a central support, to which the receiver support 2 and the reflective surface support 26 are connected. In this example, an extension tube 52 is provided, with a lower end plate 54. This extends the overall length of the central support. This may be advantageous where it is desired to ensure that the bottom chord 10 of the first truss 6 is straight and below the structure supporting the reflective surface and the reflective surface. In this case, the chords 10 can be attached to the central support structure 34 at the centre of the dish at a point significantly below the plate 40. Without the extension tube 52, the lower attachment point may cause the frustum shaped structure formed from plates 40, 44 and 46 to be too long and flexible.

In all embodiments of the central support, reinforcing plates or members can by fixed in the space inside the triangle formed by plates 38 and 42 and the frustum formed by plates 40,44 and 46 to increase their stiffness. Again, other shapes may be formed for connection of the chords or other members.

Chord members 8 and 10 are only fixed at one end, the end where they attach to structure 34 at the centre of the dish. Thus they have to be of large enough cross sectional size to resist bucking when in axial compression with one end free to move. Top chords 8 are preferably of larger size than bottom chords 10. Chords 10 may be approximately ¾ he cross sectional size of chords 8. This is because the top chords are longer so need to be larger to resist buckling under compression. Members 4 and chords 8 and 10 are preferably tubes with circular cross section, and to reduce weight can have very thin walls, approximately $1/100^{th}$ of their diameter. Typically the cross-section of the members 4, chords 8 and chords 10 are in the range 0.5 to 1 meter, 0.7 to 1.2 metre and 0.6 to 1.1 meter respectively. Hollow tubes, which can have non-circular cross-sections, provide strength but light weight can be used.

It may be preferable to pass top chords 8 through the reflective surface support 26 below or partially below the reflective surface. This minimises interception of the incoming and reflected waves. The bottom chords 10 could also be passed through the reflective surface support 26.

When the whole structure is mounted so that the same point on the edge of the dish is always lowest as the dish tilts to the vertical, one of top chords 8, the lower one when the dish is vertical, is only ever in tension, apart from possible loads caused by very strong winds. Thus this chord could be a member of smaller cross sectional size, but the same area, to ensure equal displacements of trusses 6 when the whole structure is horizontal, as the opposite chord 8. This smaller chord would intercept less incoming and reflected waves. This chord is however beneath member 4 which may be of quite large cross sectional size, approximately ⅔ that of chord 8, so most of the incoming waves are intercepted by member 4. Thus the members forming chord 8 are preferably identical for ease of construction and to maintain an even weight distribution.

As the whole structure tilts from the horizontal to the vertical, members 4 and trusses 6 which support the receiver displace by a different amount and in different directions to the displacements of the two lighter trusses 14.

The wires 16 which connect the ends of these two trusses 14 to the receiver and are placed in tension during construction of the whole structure. The different displacements of members 4 at the receiver and lighter trusses 14 are preferably smaller than would be needed to move the ends of lighter trusses 14 towards the receiver end of members 4 and relieve the tension in wires 16. Tension in wires 16 helps to minimise sideways movement of the receiver and the members 4 supporting it.

Trusses 6 supporting members 4 are much stiffer than the lighter trusses 14 so trusses 6 would tend to displace as if they were not connected to the lighter trusses 14 and pull lighter trusses 14 with them through wires 16. However, in some cases, the lighter trusses 14 may be omitted.

The outer end of trusses 6 and the end of members 4 where they connect to trusses 6 can be positioned outside the edge, at the edge or inside the edge of the reflective surface. With chords 8 above the reflective surface the incoming waves are intercepted by chords 8 before they reach the reflective surface. Members 4 also intercept some incoming waves, but they are smaller then chords 8 so their effect is negated by chords 8. The waves reflected from the reflective surface of the dish form a hypothetical cone. The edge of this cone is at the outer edge of the reflective surface and the point is at the focal point or region of the dish. When the outer end of trusses 6 and the end of members 4 are positioned outside the edge of the reflective surface of the dish, all the incoming waves, except those which just pass next to the edge of the chord 8, reflected by the reflective surface reach the receiver and the hypothetical cone is below member 4. Incoming waves which just pass the edge of chords 8 are reflected from the reflective surface towards the receiver. The receiver or focal point is smaller than the width of chords 8 so these reflected waves are intercepted by the lower edge of chords 8.

If the ends of the chords 8 and members 4 are positioned closer to the centre of the dish, trusses 6 are shorter and lighter, and the receiver support structure stiffer. However as the position of the end of trusses 6 and the end of member 4 are moved in towards the centre of the dish, members 4 and 8 start to intercept the hypothetical cone. The first portion of the cone to be intercepted is the portion which is reflected from the outer edge of the dish next to chord 8, assuming chord 8 is above the reflective surface of the dish.

Thus if interception of reflected waves is to be minimised and the end of trusses 6 and the end of members 4 are to be positioned as close to the centre of the dish as possible, the end of trusses 6 and the end of members 4 should be positioned where waves reflected from the outer edge of the dish which just pass next to chord 8 also just pass under members 4 without being intercepted by it. This places the end of trusses 6 and members 4 close to the outer edge of the dish.

With the lower edge of chords 8 intercepting reflected radiation on its way to the receiver, it is preferable that, if chords 8 are above the reflective surface of the dish, they are positioned close to the reflective surface. The higher chords 8 are above the reflective surface, the more reflected radiation they intercept within the hypothetical cone. It may be preferable to bend chords 8, or form them from a number of straight lengths connected together at angles to closely match the curve of the reflective surface, rather than have them straight. This would however slightly reduce the stiffness of trusses 6.

Bottom chord 10 could also be curved or formed from a series of straight sections connected at angles. This allows the inner end of the chord 10 to be closer to the bottom plate 40 on structure 36. This would reduce the distance between the points where the chord 10 and the lower chords of trusses 28 attach to structure 36 and the distance between the connection point for chord 10 and the support for structure 36.

To ensure that members 4 do not intercept reflected radiation, it is preferred that the point where members 4 meet is placed above the focal point or region of the dish. This allows the receiver to be placed at the focal point of the dish.

Lighter trusses 14 comprise two top chords and one bottom chord. The outer ends of these trusses are attached to wires 16 which are in tension. This tends to pull the light truss up causing the top chords to be in compression. The two top chords have to be braced together and far enough apart to be able to carry this compressive load when only supported from one end, that end being at structure 34 at the centre of the dish. The bottom chords should always be in tension due to the tension in wires 16 so do not need to be of cross sectional size to resist compression. The two top chords also are far enough apart to reduce displacements of the trusses under gravity when the whole structure is vertical. It may be preferable to replace the single bottom chord with a pair of chords braced together similar to the top chords. This reduces the displacements of the lighter trusses under gravity when the whole structure is vertical. This would make the lighter trusses into box trusses rather than triangular ones. Displacements could also be reduced by putting plates 48 further apart on structure 34 at the centre of the whole structure. If necessary further members could be added between the plates 48 and plate 38. This would reduce the ratio of span to depth of top chords 18 and make lighter truss 14 stiffer when the whole structure is vertical. If the single bottom chord 22 is replaced with a pair of chords the ratio of span to depth could be increased in a similar way.

Figure 5:
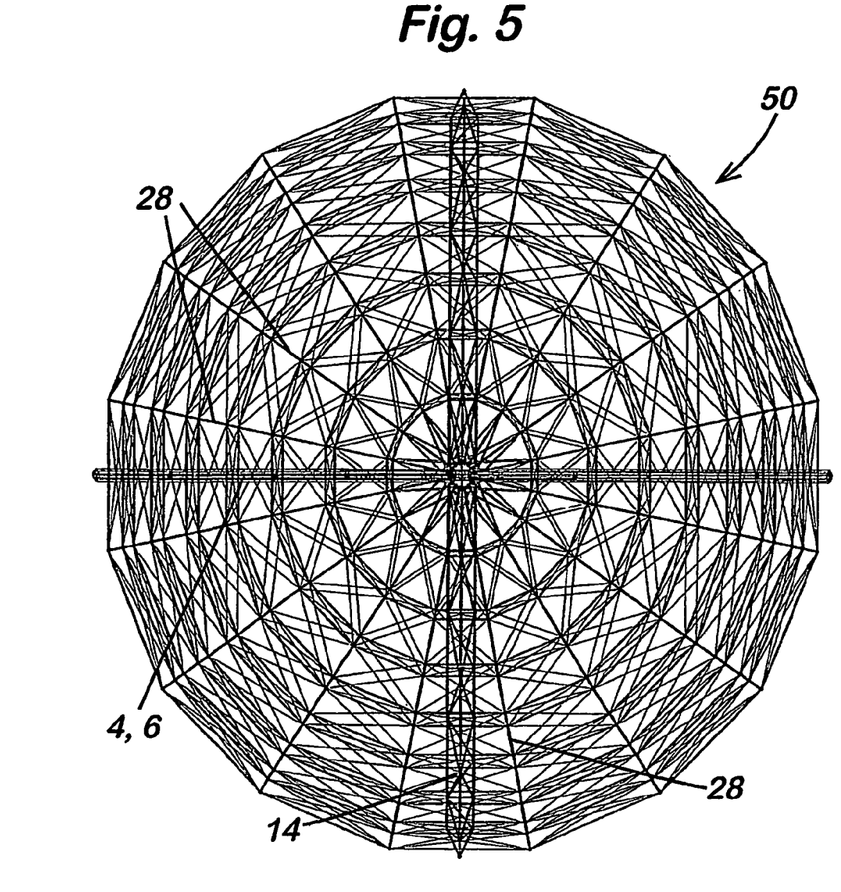
FIG. 5 shows a plan view of the structure of FIG. 4.

It is preferable that the top chords of the lighter trusses pass under the reflective surface of the dish, and through the structure which supports the reflective surface of the dish, just below the top chords of trusses 28 and members 30. The bracing between the top and bottom chords 24 passes through the reflective surface support structure 26. The bottom chords of lighter trusses are below structure 26. It may be preferable to place the lighter trusses between two of trusses 28 which support the reflective surface as shown in FIG. 5. It is also possible to place one of trusses 28 along the middle of trusses 14.

Structure 32 supports the whole dish and receiver support structures. This in turn can be supported by a pivot beneath it to allow tracking. A frame in the shape of an inverted V frame could also be used to support structure 34. Each side of the inverted V frame could comprise a box truss made up of two chords at the top and two at the bottom, all the chords being braced together. The top two chords are fixed to a point on or close to circular plate 38 and the bottom two chords attached to a point on or close to plate 40. The inverted V frame passes through the structure which supports the reflective surface to a pivot outside the structure supporting the reflective surface. In this case it is preferred that the whole structure be tilted by an actuator lifting on the bottom of structure 34 at the centre of the dish.

Figure 9:
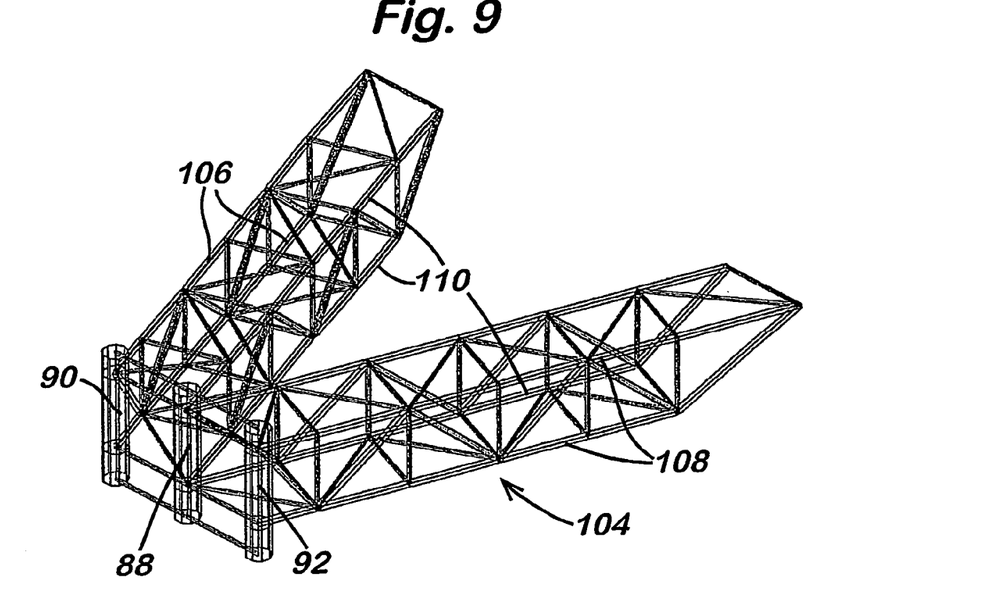
FIG. 9 shows a support for an alternative example of a central support structure.

The inverted V frame would in fact be similar to frame 104 in FIG. 9, except that supports 90 and 92 would be removed and the ends of chords 106 and 108 would converge on central support 80.

It is preferable that any mounting which supports the whole structure does so through the structure 34 at the centre of the dish only and does not make any contact capable of carrying significant loads between itself and the structure supporting the reflective surface, and preferably not the structure supporting the receiver. The structure supporting the receiver may transfer some loads to the mounting, because it is much stiffer than the structure supporting the reflective surface and is less likely to be distorted by any forces passed between it and the mounting.

When an inverted V support is used to support the whole structure, it is preferred that the support attaches to the whole structure at points close to the inner ends of the chords of the trusses supporting the reflective surface and the receiver.

In the above embodiment there are two members 4 and trusses 6 on opposite sides of the dish. In another embodiment (not shown) it is possible to use just one member 4 and receiver support truss 6. In this case it is preferable to place the truss 6 so that when the dish is vertical the point on the truss 6 where member 4 is connected to the end of the truss 6 is at the lowest point on the dish. This ensures the plane of the forces of the weight of the receiver and member 4 and truss 6 are always in the plane of the truss 6. Member 4 is supported at one end only, so is of larger cross sectional size, than members 4 in the embodiment with two or more trusses 6, to resist buckling under the compressive load of the receiver. A member placed approximately between the centre of the dish and any point along the underside of member 4 would stiffen member 4 and the receiver support structure. In this embodiment lighter trusses 14 may not be needed.

In another embodiment more than two opposite trusses 6 and members 4 could be used. This is useful if the whole structure is mounted on a system which, when moving the whole structure to track its target, results in the same point on the dish not always being the lowest. In this case trusses 14 would not be needed, because the top of members 4 would brace themselves. However the weight of the trusses and receiver would not always be in the plane of all the trusses, so would cause larger displacements of the structure supporting the receiver.

Depending on how structure 34 at the centre of the whole structure is mounted, its relatively small size means there is a small area to mount it to, and particularly if it is fixed to its mounting from the bottom only, the whole structure could be difficult to control. Here the size of the structure at the centre of the dish could be increased to provide a larger mounting area.

Structure 34 at the centre of the dish could take the form of a ring with trusses 6 and 14 fixed outside it. Such a ring could be up to one third of the diameter of the dish. The structure supporting the reflective surface would also be fixed outside this ring. If the ring is large enough it may be necessary to attach a structure inside the ring to support the centre portion of the reflective surface. It would be preferred to support the structure inside the ring at the ring only to minimise displacements. The ring could be reinforced across its centre to increase its stiffness particularly in the planes of trusses 6 where the forces are highest. If more than two trusses 6 are used then reinforcements could meet in the centre of the ring and branch off in the planes of each of trusses 6 which each piece of reinforcement is supporting through the ring. It is preferable that any reinforcement does not make load-bearing contact between itself and the structure supporting the reflective surface in the centre portion of the dish.

Again depending on how the structure at the centre of the dish is supported, it may be preferable to extend the structure at the centre of the dish upwards or downwards when the dish is horizontal and place the whole of trusses 6 and possibly lighter trusses 14 above the reflective surface of the dish, or below the structure which supports the reflective surface. It is possible to do this with all embodiments.

In an alternative example of the present invention, wires, similar to wires 16, may be provided between selected parts of the reflective surface support 26 to a point on the members 4 near the receiver.

In a further example of the present invention, the centre tube of the central support 34 may be formed from the inner bracing members of the trusses 28 that form the reflective surface support 26. These inner bracing members are arranged in a ring around the centre of the dish. End plates 38, 40 are fixed to the inner ends of trusses 28, to which the plates for supporting the top and bottom chords of the trusses of the receiver support 2 are connected.

Figure 7:
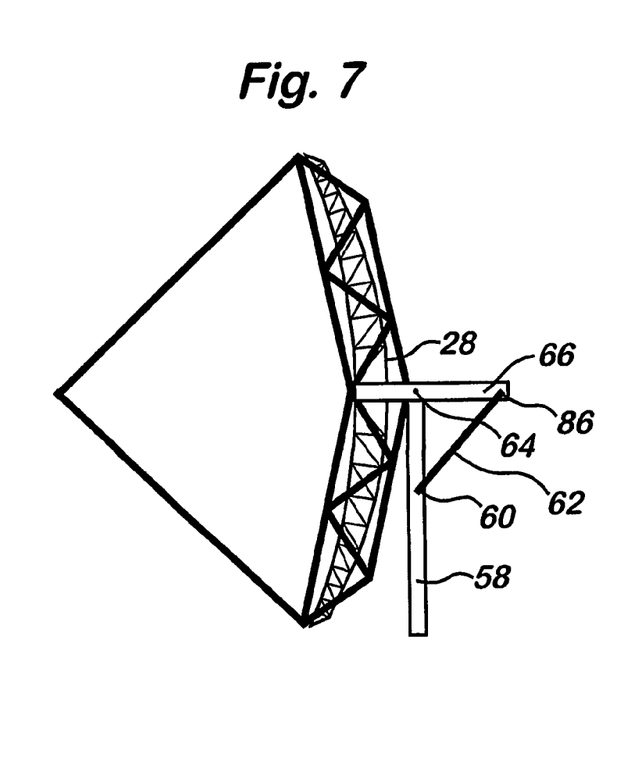
FIG. 7 shows a side view of a dish according to a further example of the present invention.
Figure 8:
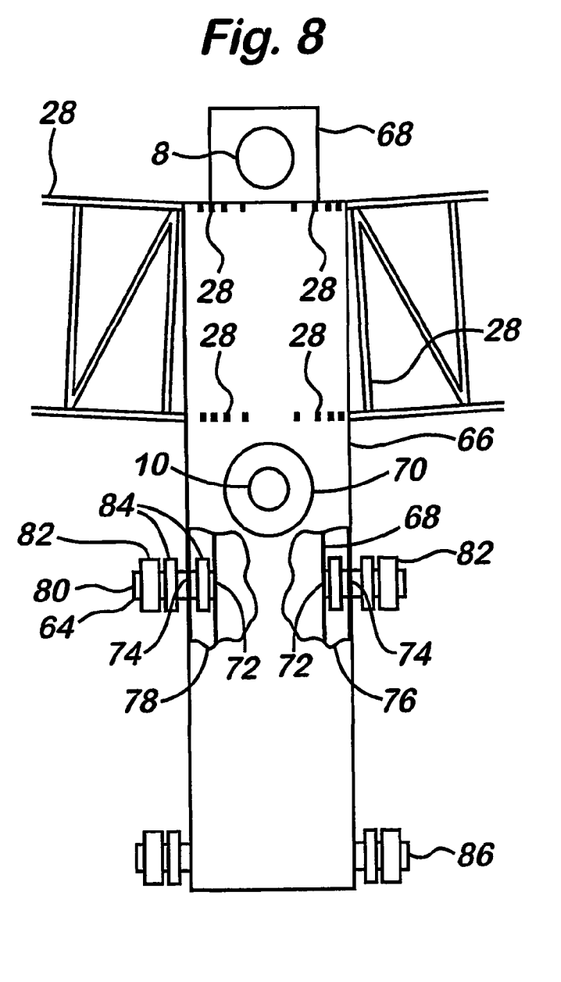
FIG. 8 shows a schematic view of the central support section of the example shown in FIG. 7.

In a still further example of the present invention, as shown in FIGS. 7 and 8, a pair of concentric tubes 66, 68 are provided to which the respective receiver support 2 and reflective surface support 26 are connected. As shown best in FIG. 8, there is provided an inner tube 68 within an outer tube 66. The inner tube 68 extends beyond the outer tube 66. The top chord 8 of the or each truss 6 is connected to the protruding end of the inner tube 68. A hole 70 is provided in the outer tube 66 through which the bottom chord 10 of the truss 6 passes to connect to the inner tube 68. Where more than one truss 6 is provided for the receiver support 2, additional openings 70 will be provided in the outer tube 66. The chords of the trusses 28 forming the reflective surface support 26 are connected directly to the outer tube 66. Trusses 14 could be attached to inner tube 68 through an opening in tube 66, or could be connected directly to tube 66 without greatly effecting the performance of the whole structure. This is because the forces on these trusses are small and would not have much effect on tubes 66.

The inner and outer tubes 66, 68 are supported by a suitable support 58, on which the entire dish is supported. The tubes 66, 68 are pivotally connected to the support 58 by a pivot pin 80 of a pivot 64 which passes through holes 74, 72 in the outer and inner tubes 66, 68 respectively. The pivot 64 is connected to the top of the support 58 by a plate 82. Washers 84 are provided to space the inner and outer tubes 68, 66 and the outer tube 66 and the support 58. A similar pivot arrangement 86 is provided at the rear of the tubes 66, 68 to connect to an actuator mechanism 62, which is in turn connected to the support 58. The actuator 62 is actuated to vary its length, which causes the tubes 66, 68 to pivot about the pivot 64 to change the elevation of the receiver and dish.

With this arrangement, the inner and outer tubes 66, 68 are not connected to each other until they reach the pivot pins 72. In this way, any displacement of one or other of the tubes 66, 68 due to the support of the respective reflective surface and receiver will not be transmitted to the other tube, and therefore will not cause displacement of the other support. To ensure that the structures supporting the receiver and reflective surface are supported by a stiff structure tubes 66 and 68 are of relatively large diameter, maybe $\frac{1}{20}^{th}$ or $\frac{1}{30}^{th}$ the diameter of the dish, with relatively thick walls. The diameter may be between 1 and 3 meters, with a wall thickness of around 25 mm.

The tubes 66, 68 could be supported to a main support structure in any other manner. For example, the support structure may be in the form of an inverted V-shaped support, and the two tubes 66, 68 may be bolted or otherwise connected to this in any suitable manner.

In the above examples, the support for the receiver is described as including a radially extending truss, with an elongate member extending from the end of the truss to the receiver. However, in some cases, it may be possible to replace the truss with another elongate member, for example a tube or hollow member of rectangular or other cross-section. The operation of the invention is otherwise essentially unchanged. Equally, the second elongate support member could take the forms of a triangular or square box frame or truss.

Figure 10:
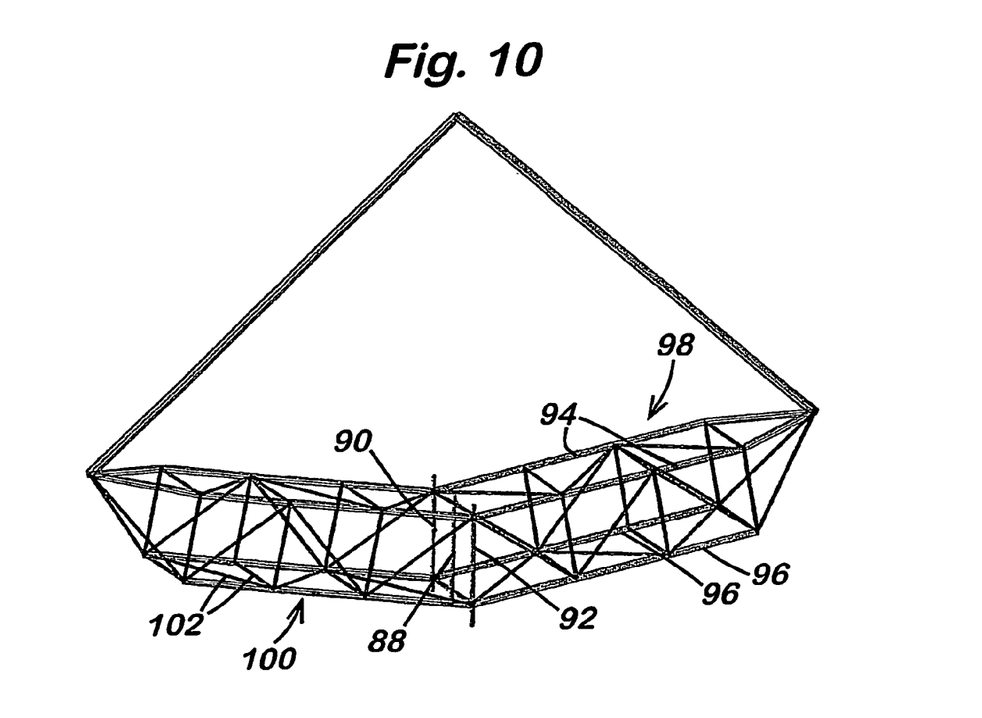
FIG. 10 shows a further example of a receiver support for use with the central support structure of FIG. 9; and, FIG. 11 shows a further example of the receiver support using a central support tube braced with wires.

FIGS. 9 and 10 show a further alternative example of the present invention. In this example, three support members 88, 90 and 92 are provided near to the centre of the dish. The central support member 88 is provided to support the support for the reflective surface. Top and bottom chords 94, 96 of two box trusses 98, 100 are connected to the outer support members 90, 92. The chords 94, 96 are linked by bracing members 102. Elongate members leading to the receiver extend from the end of the trusses 98, 100. The top chords 94 of the trusses 98, 100 forming the first elongate support members are connected in front of the reflective surface and the bottom chords 96 are provided behind the reflective surface. Due to the use of box trusses 98, 100, the effective size of the chords is the distance between the trusses. This allows the chords to more easily resist compression when they are supported from one end only, and therefore allows the chords themselves to be of a smaller cross sectional size. This in turn allows a reduction in weight of the chords, whilst reducing the likelihood of the trusses twisting.

As shown in FIG. 9, the three member central support structure 88, 90, 92 is itself supported by an inverted-V frame. The legs of the frame are each formed from a box frame 104, in which the outer frames 106, 108 support the outer support members 90, 92 respectively, and the inner frames 110 support the central support member 88. In use, this inverted V shape frame will pass through the reflective surface support.

When the dish is vertical, its weight will be supported by the inverted V shape frame, the chords of which will be compressed or stretched. This in turn will cause the supports members 88, 90, 92 to displace, and therefore the structures supporting the receiver and the reflective surface will move. By selection of the cross-sectional area of the materials forming the chords of the box frames, the displacement can be controlled, possibly enhancing the optical performance of the dish.

Figure 11:
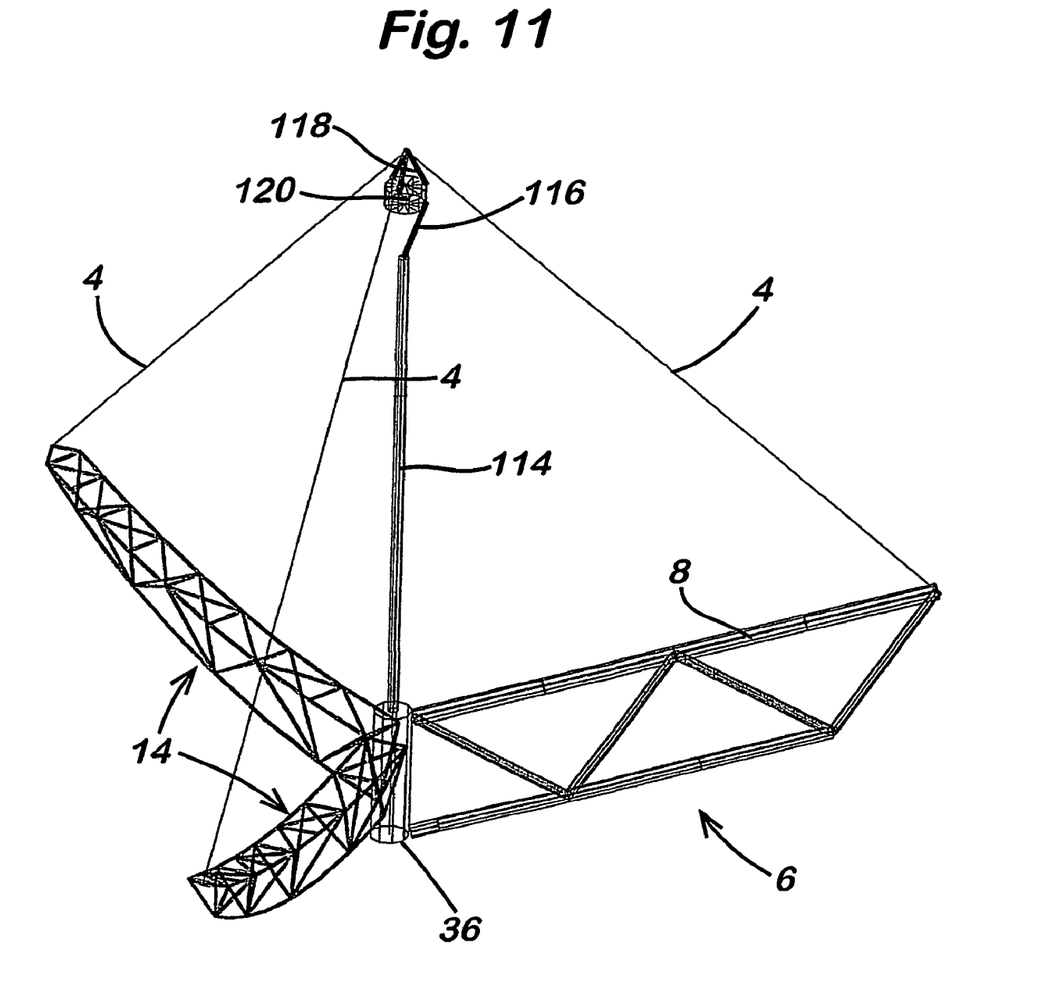

In another embodiment shown in FIG. 11, the receiver is supported by one truss 6, preferably positioned with its outer end on the highest point of the dish when it is vertical. Two light trusses 14, are positioned 120° around the dish from the truss 6. All members 4 extending from, or near the receiver 120 to trusses 6 and 14 take the form of wires. A central support tube 114 extends from the centre of the dish to just below the receiver. From this tube, at least one member 116 extends to the receiver to support it. A further member or members 118 extend from the receiver 120 to the point where wires 4 meet.

Wires 4 are preferably placed in tension, placing the central support tube 114 in compression, and members 116 and members 118 in compression and bending. As the dish approaches vertical, the tension in wires 4, the weight of the receiver trusses 14 and the vertical tube are all placed on truss 6 through the wire 4 extending from the end of truss 6 to the receiver or members 118. Thus truss 6 has to be stiff to support these loads without unacceptable displacements. Member 116 which extends from the top of the central tube to the receiver does intercept some radiation between the reflective surface and the receiver. If chord 8 of truss 6 is above the reflective surface, this interception can be minimised by placing member 116 directly above chord 8.

A frame can surround and support the receiver and transfer forces from the ends of member 118 to member 116. The receiver could also be supported by a member extending from the top of central tube 114 through the centre of the receiver to the point, preferably above the receiver, where wires 4 meet. This member would be vertical when the dish is horizontal. The receiver could be designed around this member, or it could form part of the absorbing surface of the receiver or another component of the receiver.

Truss 6 could be replaced by a heavier and stiffer version of truss 14, because the bottom chord 10 is always in tension due to the tension of wires 4, so does not need to be of large enough diameter to resist compression.

In all cases, it will be appreciated that the trusses may be replaced by alternative elongate members of sufficient strength and light weight, for example solid boxes.

Whilst it is described that the dish is circular, it can be of many different shapes. For example, square dishes can be used if space is limited. An elliptical dish may be used with its long axis parallel to the ground if height is limited, or an uneven distribution of energy is required at the receiver. An elliptical dish can place more energy in the focal region which is reflected from the long axis of the ellipse. The dish may also be semi-circular on one portion and elliptical on the other, or of another asymmetrical shape. It is also possible for the structure supporting the structure with supports the reflective surface not to be positioned directly below the receiver when the dish is horizontal. The structure supporting the structure which supports the receiver may also not be directly below the receiver when the dish is horizontal.

It is also possible that the means or structures supporting the structures which support the structure supporting the reflective surface and the structure supporting the receiver above the ground do not contact with each other. The structures which the support structure supporting the reflective surface and the structure supporting the receiver are not necessarily in contact with each other.

It is also described that the dish moves from horizontal to vertical. However, it will be understood that in some cases it may only need to move to positions between these extremes.

What is claimed is:

1. A reflector dish comprising:
a reflective surface for reflecting incident radiation to a focal region;

a receiver for receiving radiation reflected by the reflective surface;

a reflective surface support (26) for supporting the reflective surface; and, a receiver support (2) for supporting the receiver substantially in the focal region of the reflecting surface, the receiver support (2) not being in load bearing contact with the reflective surface, in which the reflective surface support (26) and the receiver support (2) are each supported by a support means (34) provided generally on or close to the central axis of the dish, and in which the receiver support (2) includes at least one first elongate member (6) extending from substantially the central axis of the dish towards the outside of the dish, and at least one second elongate member (4) extending from the outer end of the elongate support member (6) and connected to the receiver for supporting the receiver.

2. A reflector dish according to claim 1, in which the receiver is arranged to receive and use the reflected radiation.

3. A reflector dish according to claim 1, in which the receiver comprises a reflector or other optical component for directing the radiation to another component for using the reflected radiation.

4. A reflector dish according to any one of the preceding claims, in which the second elongate member (4) is mounted above the hypothetical cone of radiation reflected from the reflective surface.

5. A reflector dish according to claim 1, in which the receiver support (2) includes more than one first and second elongate member (6,4).

6. A reflector dish according to claim 5, in which two or more first elongate members (6) are provided extending from substantially the central axis of the dish, with a second elongate member (4) extending from the outer end of each said first elongate member (6) to the receiver.

7. A reflector dish according to claim 1, in which the, or one of the, where there are more than one, first elongate members (6) is positioned to be approximately vertical when the dish is vertical.

8. A reflector dish according to claim 1, in which the first elongate member (6), or members, of the receiver support is in the form of a truss or trusses or a hollow, box-like structure.

9. A reflector dish according to claim 8, in which the truss or trusses comprise a top and a bottom chord (8,10).

10. A reflector dish according to claim 8, in which the truss or trusses include a top chord and two bottom chords, or two top chords and one bottom chord to make a triangular truss.

11. A reflector dish according to claim 8, in which the truss or trusses include two top chords and two bottom chords to form a box truss.

12. A reflector dish according to claim 8, in which the truss or trusses have a top chord of larger diameter or size than the bottom chord.

13. A reflector dish according to claim 8 in which the truss or trusses have a bottom chord of diameter about ¾ that of a top chord.

14. A reflector dish according to claim 8 in which the truss or trusses have chords formed from hollow tubes.

15. A reflector dish according to claim 1, in which the reflective surface support (26) includes a plurality of trusses.

16. A reflector dish according to claim 1, in which the receiver support (2) extends through the reflective surface.

17. A reflector dish according to claim 1, in which the reflective surface is removed or omitted in the areas below the receiver support (2).

18. A reflector dish according to claim 1, in which, where any part of the first elongate member (4) is positioned above the reflective surface of the dish, that the part is close to the reflective surface to minimise interception of radiation reflected therefrom.

19. A reflector dish according to claim 1, in which the support means (34) provided on or close to the central axis of the dish comprises a single support member (36), two concentric tubes (36,52), a plurality of separate members or a ring.

20. A reflector dish according to claim 1, in which the support means provided on or close to the central axis of the dish comprises a ring formed from the inner cross-members of trusses (28) forming the reflective surface support (26), with plates attached to the ring to which the first elongate member (6) of the receiver support (2) is attached.

21. A reflector dish according to claim 1, in which the reflective surface support (26) is supported by a first member, the receiver support is supported by a second member, the two members being commonly supported.

22. A reflector dish according to claim 1, in which the support means (34) are stiff, and formed from load bearing material to minimise displacements of the receiver.

23. A reflector dish according to claim 1, in which the receiver support is arranged to displace slightly to ensure the receiver remains in the focal region.

* * * * *